United States Patent
Nagata et al.

(10) Patent No.: US 7,788,017 B2
(45) Date of Patent: Aug. 31, 2010

(54) ENGINE CONTROL, FUEL PROPERTY DETECTION AND DETERMINATION APPARATUS, AND METHOD FOR THE SAME

(75) Inventors: Tetsuji Nagata, Kariya (JP); Yousuke Nakagawa, Kariya (JP)

(73) Assignee: Denso Corporation, Kariya (JP)

( * ) Notice: Subject to any disclaimer, the term of this patent is extended or adjusted under 35 U.S.C. 154(b) by 116 days.

(21) Appl. No.: 12/000,388

(22) Filed: Dec. 12, 2007

(65) Prior Publication Data

US 2008/0162017 A1 Jul. 3, 2008

(30) Foreign Application Priority Data

Dec. 27, 2006 (JP) .............................. 2006-351632
Jan. 16, 2007 (JP) .............................. 2007-006567

(51) Int. Cl.
*F02D 41/30* (2006.01)
(52) U.S. Cl. .................. 701/103; 701/104; 123/406.23
(58) Field of Classification Search ......... 701/102–105, 701/111–114; 123/435, 406.23, 406.47
See application file for complete search history.

(56) References Cited

U.S. PATENT DOCUMENTS 6,722,345 B2 * 4/2004 Saeki et al. ................. 123/435
7,000,600 B1 * 2/2006 Yamada et al. .............. 123/501
7,013,865 B2 * 3/2006 Nagai et al. ................. 123/305
2006/0249120 A1 * 11/2006 Semii et al. ................. 123/446

FOREIGN PATENT DOCUMENTS

| JP | 03-179150 | 8/1991 |
| JP | 07-50098 | 5/1995 |
| JP | 07-279739 | 10/1995 |
| JP | 2004-211667 | 7/2004 |

OTHER PUBLICATIONS

Japanese Office Action dated Apr. 24, 2009, issued in corresponding Japanese Application No. 2006-351632, with English translation.

* cited by examiner

*Primary Examiner*—Stephen K Cronin
*Assistant Examiner*—Johnny H Hoang
(74) *Attorney, Agent, or Firm*—Nixon & Vanderhye P.C.

(57) ABSTRACT

An engine control apparatus for controlling output torque of an engine includes a target determining unit for determining a target value of an injection quantity of fuel on the basis of pressure in a cylinder of the engine. The engine control apparatus further includes an injection control unit for controlling the injection quantity at the target value in a startup injection control period in starting of the engine. The startup injection control period is between a specific startup timing and an end timing where a specific condition is satisfied.

31 Claims, 10 Drawing Sheets

$$\text{HEAT RELEASE} = \frac{dP(\theta) \cdot V(\theta) + \kappa \cdot P(\theta) \cdot dV(\theta)}{\kappa - 1}$$

$$\text{TOTAL HEAT RELEASE} = \int_{\theta 1}^{\theta 2} (\text{HEAT RELEASE}) \, d\theta$$

ENGINE CONTROL, FUEL PROPERTY DETECTION AND DETERMINATION APPARATUS, AND METHOD FOR THE SAME

CROSS REFERENCE TO RELATED APPLICATIONS

This application is based on and incorporates herein by reference Japanese Patent Applications No. 2007-6567 filed on Jan. 16, 2007 and No. 2006-351632 filed on Dec. 27, 2006.

FIELD OF THE INVENTION

The present invention relates to an engine control apparatus and a fuel property detection apparatus for an internal combustion engine. The present invention further relates to a fuel property determination apparatus for determining a property of fuel of an internal combustion engine. The present invention further relates to a method for controlling the engine and methods for detecting and determining a fuel property.

BACKGROUND OF THE INVENTION

When an engine is controlled, a property of heaviness and lightness of fuel may not sufficiently match an engine control characteristic. In this condition, an air-fuel ratio may not be properly controlled. Consequently, air-fuel mixture may not be ignited at a desired ignition timing, and drivability and emission may be degraded. When the property of heaviness and lightness of fuel changes, the specific gravity and volatility of fuel also changes. As a result, combustion efficiency and exhaust components change, according to the heaviness and lightness of fuel. In particular, at the time of starting of an engine, when gasoline becomes heavy, volatility of the gasoline decreases. In this condition, a quantity of fuel adhering to an inside wall of an intake pipe increases in a port injection engine. Alternatively, a quantity of fuel adhering to an inside wall of a cylinder increases in a direct injection engine. Thus, air-fuel mixture becomes lean, and an air-fuel ratio increases. Contrarily, when the gasoline becomes light, volatility of the gasoline increases, and the adhering quantity of the fuel decreases. Thus, air-fuel mixture becomes rich, and an air-fuel ratio decreases.

According to JP-A-3-179150, for example, the property of heaviness and lightness of fuel is reflected to an injection control so as to restrict degradation of drivability and emission. Specifically, in JP-A-3-179150, the property of heaviness and lightness of fuel is detected by using a heaviness/lightness detection sensor provided in a fuel supply pipe or a fuel tank, and an injection quantity is corrected according to the detected property of the heaviness and lightness. When fuel is heavy fuel, an engine output becomes insufficient. Therefore, the injection quantity is corrected and increased when the fuel is heavy fuel, so that engine torque is increased, and the engine rotation speed is gradually increased. Here, a fuel injection quantity is corrected and increased in a specific startup period before warming up of the engine. When the period is set longer than an appropriate length, emission may be degraded. JP-A-3-179150, does not necessarily appropriately determine the period, in which the fuel injection quantity is corrected and increased, and may not steadily produce a preferable emission characteristic.

A conventional fuel property determination apparatus of an internal combustion engine, for example, determines a property of fuel to be heavy when rotation speed of the engine is lowered by a specific value from a target rotation speed during a specific period after starting of the engine. Moreover, the conventional fuel property determination apparatus also determines fuel to be heavy when an integrated value of rotation speed of the engine during a specific cycle after starting of the engine is less than a specific value.

However, friction or the like of the engine may smooth and reduce variations in rotation speed of the engine caused by the difference in properties of fuel. Therefore, the property of fuel cannot be determined with high accuracy on the basis of the rotation speed of the engine. Further, it is difficult to detect the heaviness of fuel with high accuracy and hence it is difficult to determine intermediate fuel having an intermediate property between those of the light fuel and the heavy fuel.

For example, JP-B2-7-50098 proposes an apparatus that calculates a combustion rate on the basis of combustion pressure of an engine and compares the combustion rate with a threshold, which corresponds to combustion rate of base fuel, to determine the property of fuel.

In general, an ignition timing of an engine greatly contributes to a state of combustion such as the combustion rate and the burning period, and when the ignition timing varies, the combustion rate also varies due to variation in the state of combustion. Accordingly, in determining the property of fuel in accordance with the combustion rate similarly to JP-B2-7-50098, a false determination may be made because of variations in the combustion rate caused by variations in the ignition timing.

In view of the foregoing and other problems, it is an object of the present invention to produce an engine control apparatus and a fuel property detection apparatus being capable of maintaining a state of combustion in starting of an engine. It is another object of the present invention to produce a fuel property detection apparatus and a fuel property determination apparatus each being capable of accurately determining a property of fuel.

It is another object of the present invention to produce a method for controlling the engine and methods for detecting and determining a fuel property.

SUMMARY OF THE INVENTION

The present invention addresses the above disadvantage. According to one aspect of the present invention, an engine control apparatus for controlling output torque produced by combustion of fuel in a cylinder of an engine, the apparatus comprises target determining means for determining a target value of an injection quantity of fuel on the basis of pressure in the cylinder. The apparatus further comprises injection control means for controlling the injection quantity at the target value in a startup injection control period in starting of the engine. The startup injection control period is between a specific startup timing and an end timing where a specific condition is satisfied.

According to another aspect of the present invention, an engine control apparatus for controlling output torque produced by combustion of fuel in a cylinder of an engine, the apparatus comprises target determining means for determining a target value of an injection quantity of fuel on the basis of pressure in the cylinder. The apparatus further comprises injection control means for controlling the injection quantity at the target value in a startup injection control period in starting of the engine. The startup injection control period starts from a specific startup timing. The startup injection control period ends in a condition where a difference between a reference burning parameter and a detected burning parameter decreases to be less than a threshold, such that decrease in rotation speed is recovered by a predetermined speed. The burning parameter is at least one of a timing when combustion ends, a period of burning, a barycenter of combustion, and a timing when a heat release rate is at a peak.

According to another aspect of the present invention, an engine control apparatus for controlling output torque produced by combustion of fuel in a cylinder of an engine, the apparatus comprises target determining means for determining a target value of the output torque on the basis of pressure in the cylinder. The apparatus further comprises torque control means for controlling a parameter, which relates to the output torque, at the target value in a startup injection control period in starting the engine. The startup injection control period is between a specific startup timing and an end timing where a specific condition is satisfied.

According to another aspect of the present invention, a fuel property detection apparatus for an engine adapted to producing output torque by combustion of fuel in a cylinder, the apparatus comprises pressure detection means for detecting pressure in the cylinder. The apparatus further comprises fuel property detection means for detecting a property of fuel on the basis of the pressure in the cylinder.

According to another aspect of the present invention, a method for controlling output torque of an engine, the method comprises determining a target value of an injection quantity of fuel on the basis of pressure in the cylinder. The apparatus further comprises controlling the injection quantity at the target value in a startup injection control period in starting of the engine. The startup injection control period is between a specific startup timing and an end timing where a specific condition is satisfied.

According to another aspect of the present invention, a method for controlling output torque of an engine, the method comprises determining a target value of the output torque on the basis of pressure in a cylinder of the engine. The method further comprises controlling a parameter, which relates to the output torque, at the target value in a startup injection control period in starting the engine. The startup injection control period is between a specific startup timing and an end timing where a specific condition is satisfied.

According to another aspect of the present invention, a method for detecting fuel property for an engine, the method comprises detecting pressure in a cylinder of the engine. The method further comprises detecting a property of fuel on the basis of the pressure in the cylinder.

According to another aspect of the present invention, a fuel property determination apparatus for an engine, the apparatus comprises burning parameter calculation means for calculating a burning parameter as information of a state of combustion on the basis of pressure in a cylinder of the engine. The apparatus further comprises fuel property determination means for determining a property of fuel on the basis of the burning parameter. The apparatus further comprises ignition timing clamping control means for performing an ignition timing clamping control until the fuel property determination means determines the property of fuel. The ignition timing clamping control includes one of: clamping an ignition timing of the engine; and restricting variations in the ignition timing.

According to another aspect of the present invention, a method for determining a fuel property for an engine, the method comprises calculating a burning parameter as information of a state of combustion on the basis of pressure in a cylinder of the engine. The method further comprises determining a property of fuel on the basis of the burning parameter. The method further performing an ignition timing clamping control until the determining of the property of fuel completes. The performing of the ignition timing clamping control includes one of: clamping an ignition timing of the engine; and restricting variations in the ignition timing.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

An engine control apparatus and a fuel property detection apparatus will be described with reference to FIG. 1 to FIG. 7.

Here, in particular, one example, in which the present apparatus is combined with a system for performing an engine control for a reciprocating engine, i.e., an internal combustion engine for a four-wheel automobile, will be described.

Figure 1:
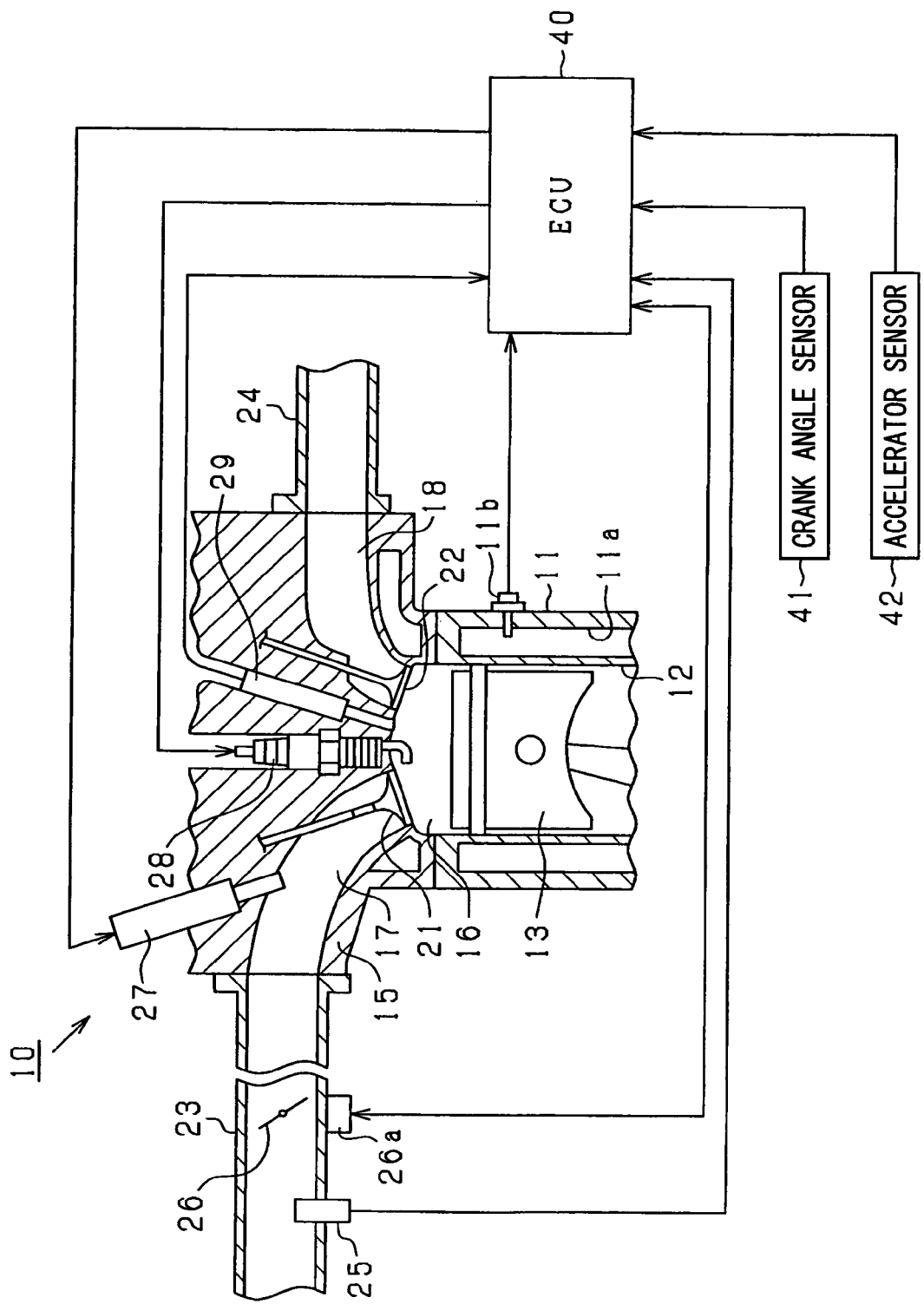
FIG. 1 is a schematic view showing an engine control apparatus and a fuel property detection apparatus according to a first embodiment.

First, the construction of the present system will be described with reference to FIG. 1. Here, FIG. 1 is a schematic view showing a general outline of a vehicle control system to which an engine control apparatus and a fuel property detection apparatus according to the present embodiment are applied. While a multi-cylinder engine such as a four-cylinder engine is assumed as an engine of the present embodiment, only one cylinder is described in FIG. 1 for the sake of convenience of description.

As shown in FIG. 1, the present engine control system controls an internal combustion engine 10 for rotating an output shaft (crankshaft, not shown) by torque generated by combustion of fuel in a cylinder 12. The present engine control system is constructed of various sensors and an electronic control unit (ECU) 40 for controlling the engine 10.

Here, the engine 10 to be controlled is a spark-ignition type reciprocating engine. The engine 10 has the cylinder 12 defined by a cylinder block 11. The cylinder block 11 has a cooling water passage 11a for circulating cooling water through the interior of the engine 10 and a water temperature sensor 11b for detecting the temperature (cooling water temperature) of cooling water passing through the water passage 11a for cooling the engine 10. Moreover, a piston 13 is housed in the cylinder 12, and is reciprocated to rotate the crankshaft as the output shaft (not shown). A crank angle sensor 41 for outputting a crank angle signal at intervals of specific crank angle such as intervals of 30° CA is provided on the outer peripheral side of this crankshaft. The crank angle sensor 41 can detect the rotational angle and the rotational speed of the crankshaft or engine rotational speed. A cylinder head 15 is fixed to the top end surface of the cylinder block 11, and a combustion chamber 16 is defined between the cylinder head 15 and the top surface of the piston 13.

The cylinder head 15 has therein an intake port 17 and an exhaust port 18. The intake port 17 and the exhaust port 18 extend into the combustion chamber 16. The intake port 17 and the exhaust port 18 are opened and closed respectively by an intake valve 21 and an exhaust valve 22, which are driven by a cam (not shown) secured to a camshaft moving in conjunction with the crankshaft. The intake port 17 is connected with an intake pipe 23 as an intake manifold for drawing outside air as fresh air into each cylinder of the engine 10. The exhaust port 18 is connected with an exhaust pipe 24 as an exhaust manifold for exhausting combustion gas as exhaust from each cylinder of the engine 10. An air flowmeter 25 is provided in the intake pipe 23 for detecting a quantity of fresh air drawn through an air cleaner provided at the most upstream portion of the intake pipe 23. An electronically controlled throttle valve 26 and a throttle position sensor 26a are provided downstream of the air flowmeter 25. The position of the throttle valve 26 is electronically controlled by an actuator such as a DC motor. The throttle position sensor 26a detects the position (throttle valve position) of the throttle valve 26 and motion, i.e., a variation in opening of the throttle valve 26.

The intake port 17 is provided with an injector 27 as a fuel injection valve for injecting and supplying fuel. The injector 27 is an electromagnetically driven, piezoelectrically driven, or the like. This injector 27 is provided to each cylinder. Fuel such as gasoline is injected and supplied to an intake passage, in particular, into the intake port 17 of each cylinder by this injector 27, thereby carrying out a port injection.

The engine 10 ignites an air-fuel mixture of intake air and fuel injected by the injector to burn the fuel. The cylinder head of the engine 10 is provided with an ignition plug 28 for each cylinder. When the air-fuel mixture is ignited in the engine 10, a high voltage is applied to the ignition plug 28 at a desired ignition timing by the ECU 40. Then, the application of the high voltage develops a spark discharge across opposed electrodes of each plug 28 and the developed spark discharge ignites and combusts the air-fuel mixture lead into the combustion chamber 16. Here, the engine 10 is a four-stroke engine. In the four-stroke engine 10, one combustion cycle including four strokes of intake, compression, combustion, and exhaust strokes is performed in sequence at intervals of 720° CA.

A cylinder pressure sensor 29 is also provided to the cylinder head 15 for detecting cylinder pressure via a detection part, which is a tip portion of a probe inserted into the combustion chamber 16. In the engine 10, the cylinder pressure sensor 29 is also provided to each cylinder. The pressure in the combustion chamber of each cylinder is detected through the cylinder pressure sensor 29.

The ECU 40 predominantly performs an engine control as an electronic control unit in the present system. The ECU 40 sequentially inputs detection signals of various sensors such as an accelerator sensor 42 for detecting a depression (accelerator position) of an accelerator by an occupant such as a driver, in addition to the outputs of the above detection signals. The ECU 40 determines an operating state of the engine 10 and a user demand on the basis of the detection signals of the various sensors, thereby operating various actuators such as the injector 27 and the ignition plug 28 in response to the operating state and the user demand. Thus, the ECU 40 performs various controls relating to the engine 10 in optimal modes responsive to the various conditions.

More specifically, the ECU 40 is constructed of a well-known microcomputer (not shown). The microcomputer is basically constructed of various processing units, storage devices, signal processing devices, and communication devices. For example, the microcomputer includes units and devices such as a central processing unit (CPU), a random access memory (RAM), a read-only memory (ROM), an electrically erasable programmable read-only memory, (electrically rewritable non-volatile memory, EEPROM), a backup RAM, a signal processing device, and input/output ports. The CPU is provided for performing various operations. The RAM is provided as a main memory for temporarily storing data and operation results in the course of the operations. The ROM is provided as a program memory. The backup RAM as memories for storing data is supplied with electric power from a backup power source such as a vehicle-mounted battery. The signal processing device may include an A/D converter and a clock generation circuit. The input/output ports are provided for inputting/outputting signals from/to an external device. Further, in the present embodiment, in addition to the CPU, a high-speed digital signal processor (DSP) is provided to improve processing speed of signal processings, in particular, signal processings relating to the output signal of the cylinder pressure, in performing the control. Various programs and control data maps relating to the engine control are stored in advance in the ROM and various control data including the design data of the engine 10 are stored in the data storage memory such as the EEPROM.

Here, an outline of a control to reflect heaviness/lightness of fuel to an injection control so as to restrict degradation of drivability and emission will be described with reference to FIG. 8. Here, an example of the present apparatus applied to an engine being started will be described.

Figure 8:
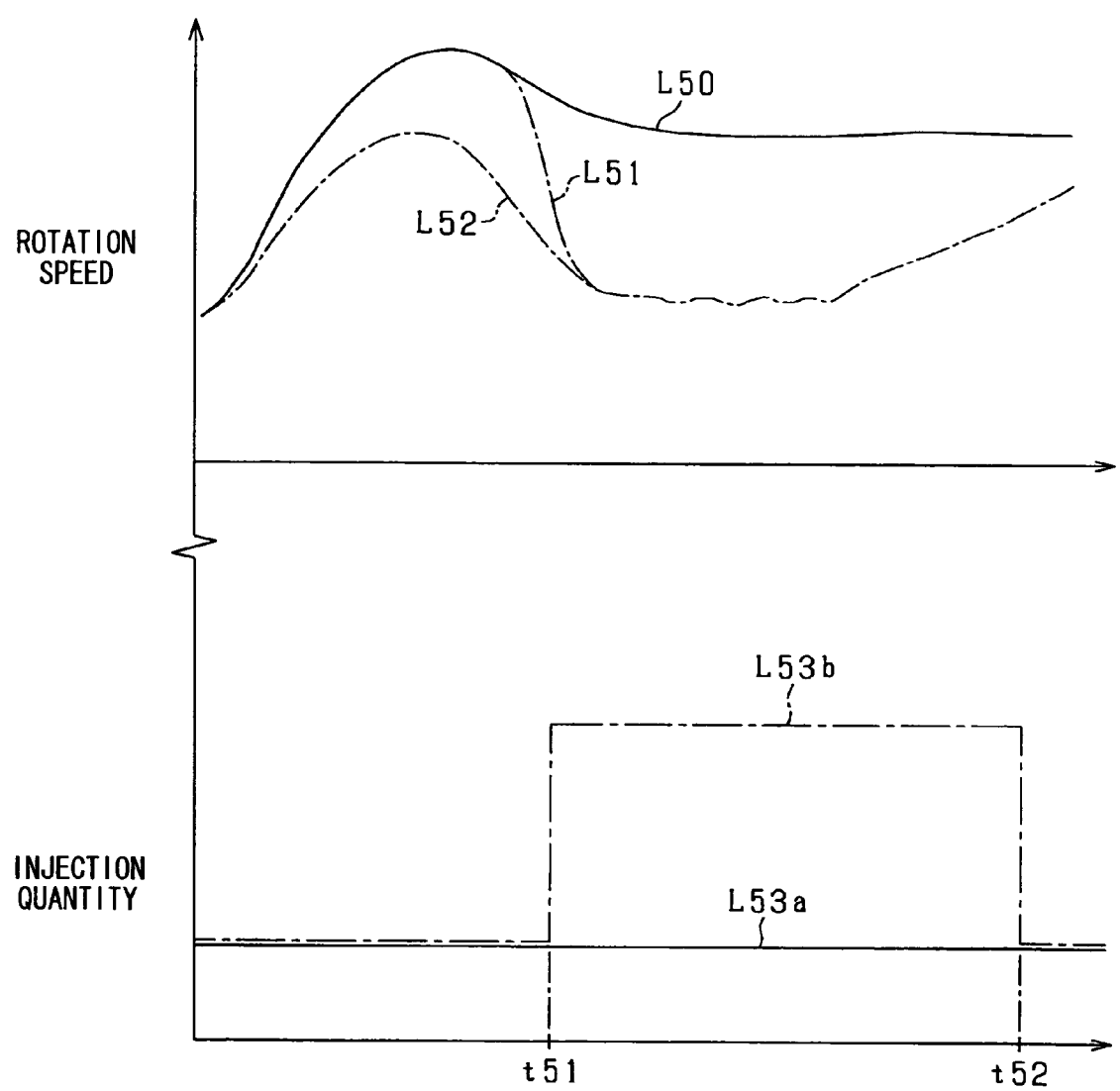
FIG. 8 is a timing chart showing an example of an injection control according to a related art.

The progress of an engine rotation speed shown by a solid line L50 in FIG. 8 corresponds to an engine startup characteristic, in particular, a rotation speed characteristic when the fuel is normal fuel, that is, the fuel that is not heavier nor lighter than the base degree of heaviness/lightness. When the fuel is heavy fuel, as shown by two examples of single dot and dash lines L51 and L52 in FIG. 8, the engine rotation speed decreases compared with that shown by the solid line L50 when normal fuel is used. As shown by a solid line L53a in FIG. 8, when the fuel is normal fuel, the engine produces normal engine rotation speed and hence the injection quantity is not increased. On the other hand, as shown by a single dot and dash line L53b in FIG. 8B, when the fuel is heavy fuel, an engine output may be insufficient and hence the injection quantity is increased. Thus, an engine torque is increased, which results in gradually increasing the engine rotation speed as shown by single dot and dash lines L51 and L52 in FIG. 8A. Here, the present quantity increase correction is performed in a startup period such as a specific period before warming up of the engine in the period from t51 to t52.

In the present embodiment, the heaviness/lightness as one of properties of the fuel is detected at the time of starting the engine, and the quantity of injection of fuel is variably controlled according to the heaviness/lightness of the fuel. That is, the degree of heaviness/lightness of the fuel is reflected by, for example, addition, subtraction, division, and multiplication, to the injection control to restrict the deterioration of drivability or emission.

Figure 2:
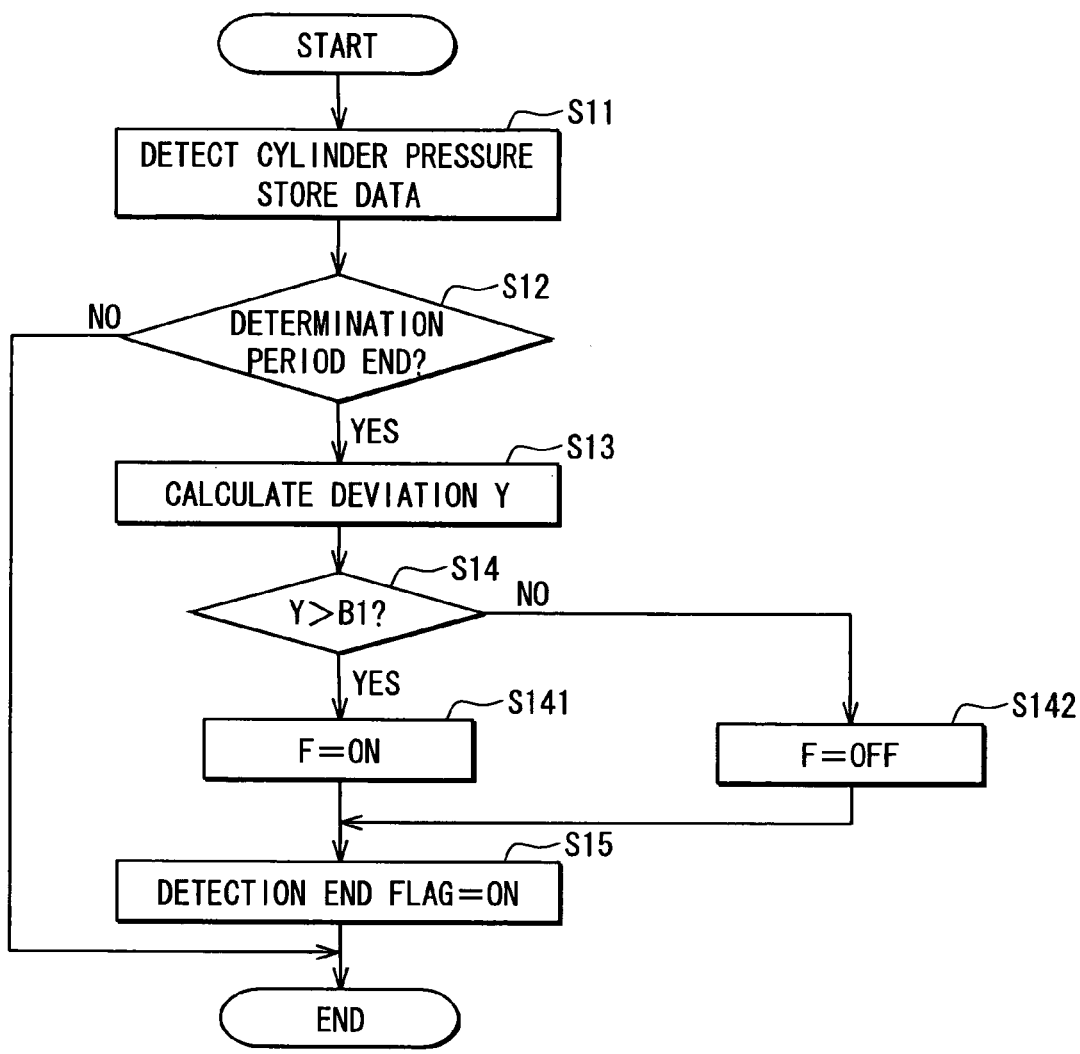
FIG. 2 is a flow chart showing a processing for detecting a property of fuel according to the first embodiment.
Figure 5:
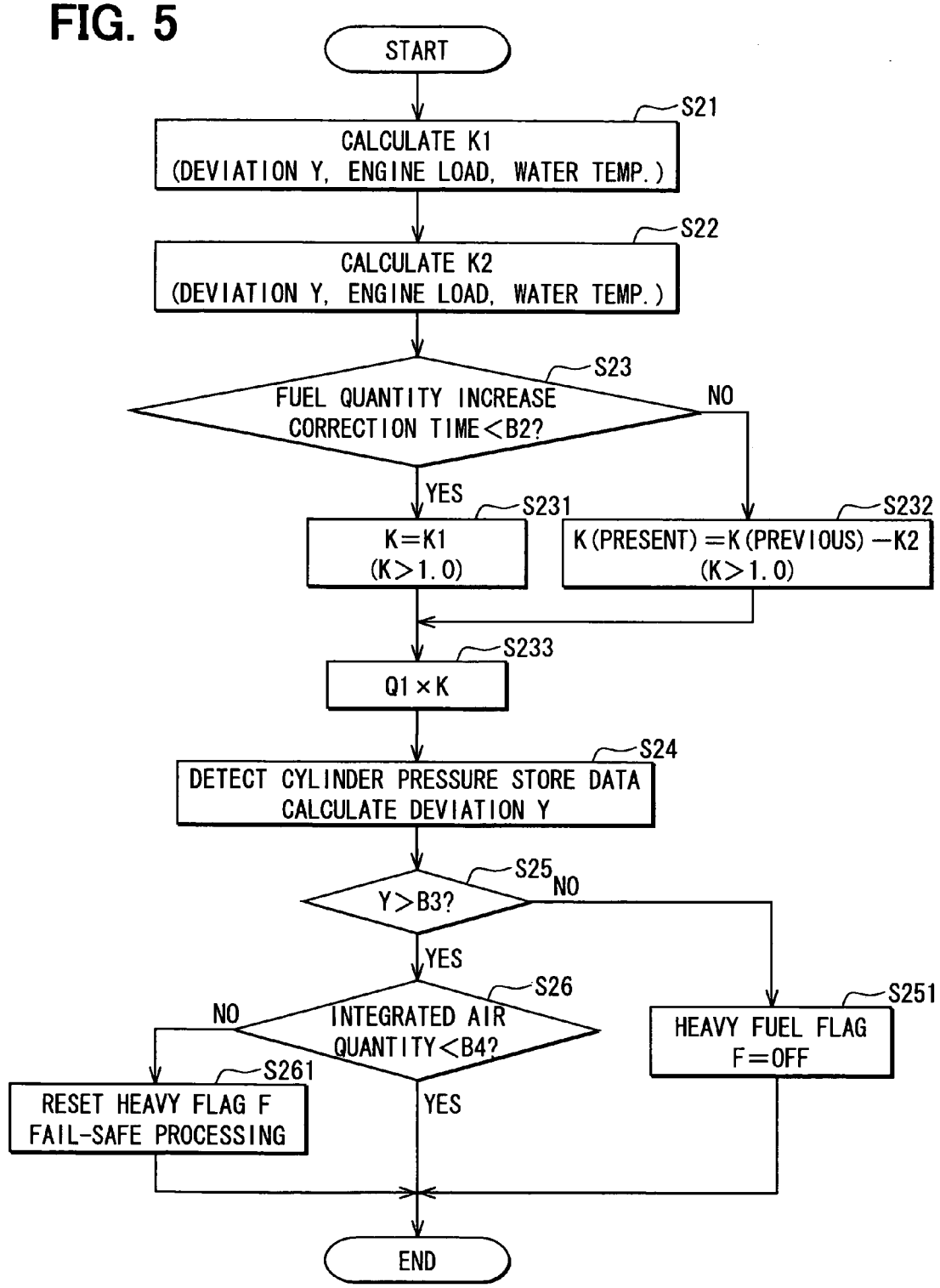
FIG. 5 is a flow chart showing a quantity increase correction according to the first embodiment.
Figure 6:
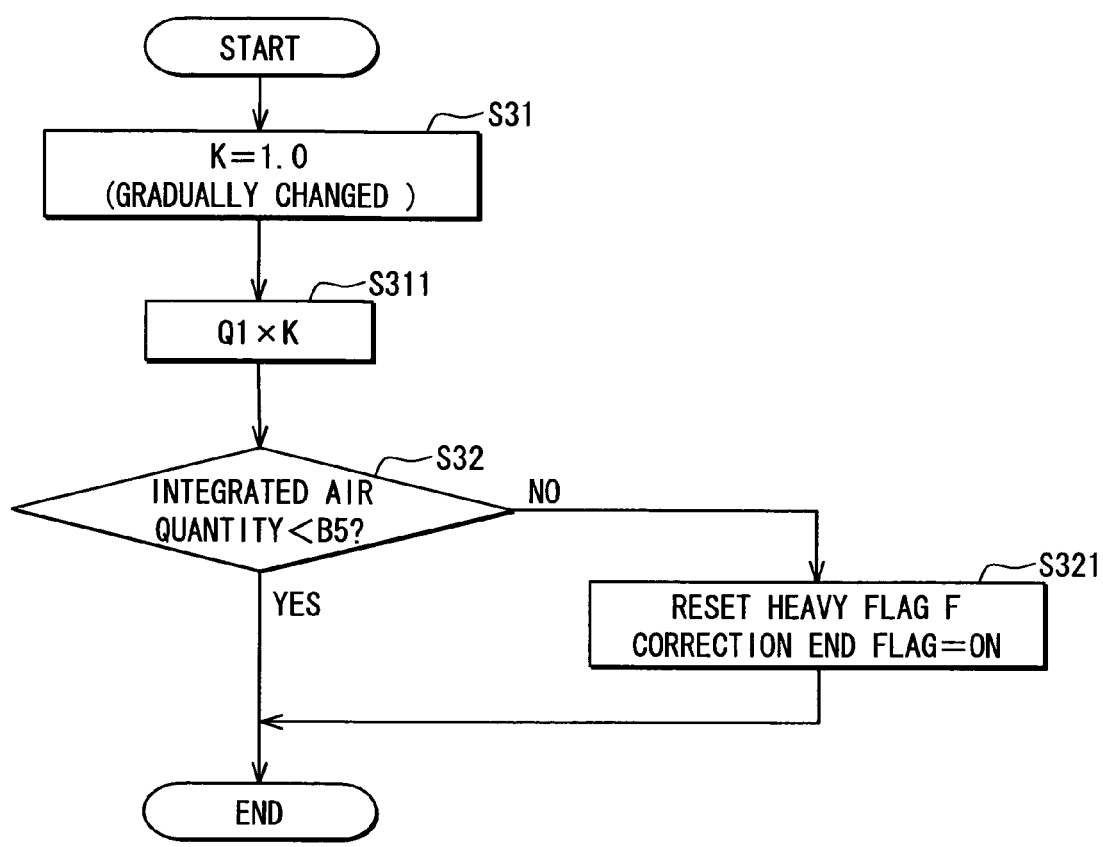
FIG. 6 is a flow chart showing an injection control when the quantity increase correction is not performed according to the first embodiment.

Here, in the present embodiment, the ECU 40 performs an injection control according to or suitable for the cylinder pressure in the course of the injection control to reduce deterioration in combustion caused in dependence upon the property of the fuel, thereby improving the combustion. One embodiment of the present injection control will be described below in detail with reference to FIG. 2 to FIG. 7. In this regard, the values of various parameters used in the processing shown in FIG. 2, FIG. 5, and FIG. 6 are sequentially stored in the storage device, and are sequentially updated as needed. The storage device may be the RAM and the EEPROM mounted in the ECU 40, or the backup RAM. The series of processings shown in FIG. 2, FIG. 5, and FIG. 6 are performed by the ECU 40 on the basis of the program stored in the ROM, in general.

First, a processing relating to detection of the property of fuel will be described with reference to FIG. 2. The processing shown in FIG. 2 is started with the starting of the engine 10. Specifically, the engine 10 is started on the basis of turning of an ignition switch ON. The ignition switch also serves as a starting switch, in addition to serving as the ignition switch. The ignition switch and is turned ON or OFF by a driver. When the driver inserts the ignition key into a key cylinder and then turns the ignition key, at the first step, a steering lock is unlocked and at the second step, a current is supplied through accessories such as a radio and at the third step, the current is supplied through the ignition device. Further, when the driver turns the ignition key one more step, a starter motor (not shown) rotates the crankshaft as the output shaft of the engine 10 to carry out a cranking to start the engine 10. The processing shown in FIG. 2 is triggered by the cranking performed by the starter motor, and thereafter the processing shown in FIG. 2 is further performed at intervals of a specific crank angle or at intervals of a specific time until a fuel property detection end flag is turned ON.

As shown in FIG. 2, in this series of the processing, first, in step S11, cylinder pressure in the combustion chamber 16 of the cylinder 12 at that time is detected by the cylinder pressure sensor 29. The detected data as an actual detected value may be stored in relation to an engine operating condition such as an engine operating condition at the time that elapses after the cranking or the accelerator position. The detected data may be stored in relation to an engine operating state such as the engine rotation speed, an engine load, or the cooling water temperature, which corresponds to the cylinder temperature. The cooling water temperature is detected by the water temperature sensor 11b. The detected data of the cylinder pressure is stored in a non-volatile manner, for example, in the EEPROM or the backup ROM so as to be used for a long time. That is, even when the current supply to the ECU 40 is stopped at the time of stopping the engine 10 and then restarted, the stored data is maintained without being erased. The processing shown in step S11 is repeatedly performed from the cranking for a specific determination period that is a fixed value of, for example, one or two combustion cycles in the present embodiment. That is, the processing in step S11 is repeatedly performed until it is determined in step S12 that the determination period is ended. The specific determination period may be a variable value.

Figure 3:
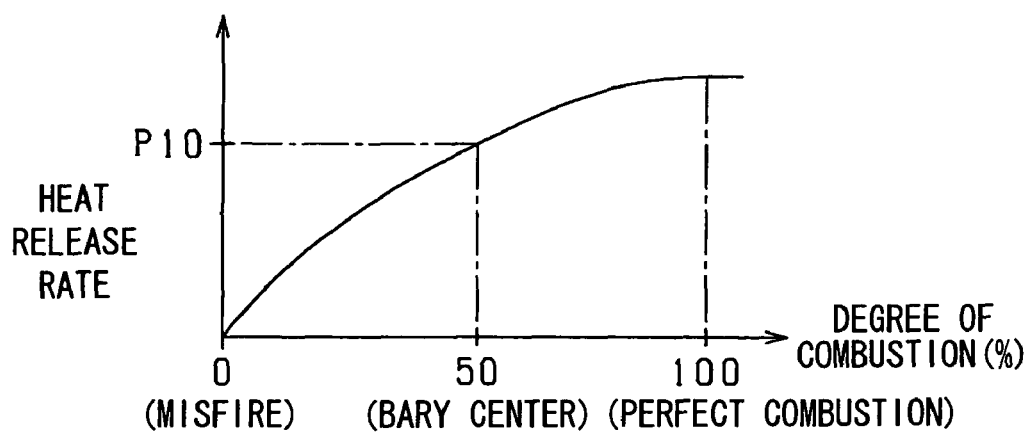
FIG. 3 is a graph showing one example of a burning parameter according to the first embodiment.
Figure 4:
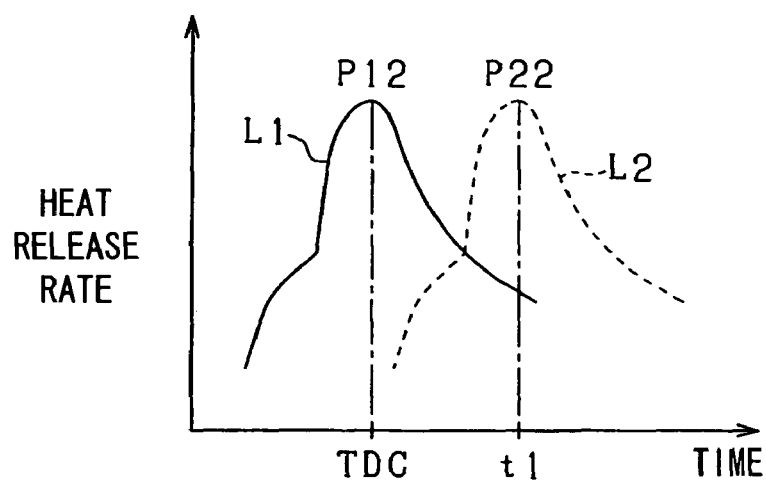
FIG. 4 is a graph showing another example of the burning parameter according to the first embodiment.

When it is determined in step S12 that the determination period is ended, it is determined that the specific determination period passes from the cranking, and the routine proceeds to step S13. In step S13, a deviation (burning parameter deviation Y) from a specific burning parameter related to the state (combustion state) of combustion or a deviation from a reference value as a normal value of the parameter is calculated on the basis of the cylinder pressure data acquired and stored in succession during the determination period. Here, one or a combination of, for example, a timing when combustion ends, the period of combustion, the barycenter of combustion, and a peak timing of a heat release rate can be used as the burning parameter. Specifically, as shown in FIG. 3, it is assumed that the degree of combustion is 0% at the time of misfire and that the degree of combustion is 100% at the time of perfect combustion, for example. In this assumption, the barycenter of combustion corresponds to the rate of release of heat (heat release rate) P10 at the degree of combustion of 50%. For example, in the characteristic shown by a solid line L1 in FIG. 4, the peak timing of the heat release rate corresponds to the timing when the heat release rate is at a peak P12 at a top dead center (TDC). For example, in the characteristic shown by a broken line L2, the peak timing of the heat release rate corresponds to the timing t1 when the heat release rate is at a peak P22. For example, the solid line L1 indicates a characteristic when the combustion state is normal. In this condition, when the characteristic shown by the broken line L2 is obtained, the time difference between the two, that is, t1−TDC is calculated as the burning parameter deviation Y.

In step S14 (FIG. 2), it is determined whether the burning parameter deviation Y calculated in step S13 is within an allowance, that is, the burning parameter deviation Y is greater than a threshold B1. The threshold B1 is a fixed value in the present embodiment. Alternatively, the threshold B1 may be a variable value. Here, when the number of the burning parameters is plural, multiple thresholds B1 are also prepared in correspondence to the multiple burning parameters. When it is determined in step S14 that the burning parameter deviation Y is greater than the threshold B1, it is determined that the fuel is heavy fuel and a heavy fuel flag F (initial value=reset) is made ON in step S141. The heavy fuel flag F is initially reset. Alternatively, when it is determined in step S14 that the burning parameter deviation Y is equal to or less than the threshold B1, it is determined that the fuel is not heavy fuel and the heavy fuel flag F is made OFF in step S142.

A fuel property detection end flag is made ON in step S15, after the heavy fuel flag F is made ON or OFF in one of steps S141 and S142. The fuel property detection end flag is initially made OFF. When the present fuel property detection end flag is made ON, the series of processing shown in FIG. 2 is ended.

Next, a fuel increase correction processing, which is triggered by making the heavy fuel flag F ON in step S141 shown in FIG. 2, will be described with reference to FIG. 5. The processing shown in FIG. 5 is performed sequentially at intervals of a specific crank angle or at intervals of a specific time until the heavy fuel flag F is made OFF or reset.

As shown in FIG. 5, in the present series of processing, in step S21, an initial value K1 (initial increase value) of a quantity increase correction factor is calculated on the basis of the burning parameter deviation Y and a specific engine operating state such as an engine load or a cylinder temperature. The burning parameter deviation Y is calculated in step S13 in FIG. 2 or in step S24 to be described later. Specifically, the initial value K1 is read from a data map in which a suitable value (optimum value) of the initial value K1 is defined in advance by experiment or the like for each burning parameter deviation Y, each engine load, and each engine cooling water temperature. The data map is stored in the ROM or the like, and may be replaced by a mathematical equation.

In step S22, a decrease rate K2 of the quantity increase correction factor is calculated on the basis of the burning parameter deviation Y and a specific engine operating state such as the engine load and the cylinder temperature. In step S22, a data map is also used. The data map may be stored in the ROM or the like, and may be replaced by a mathematical equation.

In step S23, it is determined whether the time that elapses after a quantity increase correction is started is less than a threshold B2. That is, it is determined whether the time from the timing when the heavy fuel flag F is made ON is less than the threshold B2. The threshold B2 is a fixed value in the present embodiment, but may be a variable value. The initial value K1 calculated in step S21 is repeatedly and continuously set at the quantity increase correction factor K in step S231 until the time elapses for the threshold B2 after the quantity increase correction is started.

In the present embodiment, at least at the time of starting the engine, a base injection quantity Q1 is multiplied by the quantity increase correction factor K to determine the target value of an injection quantity (=Q1×K). The base injection quantity Q1 is, for example, a value corresponding to a data map determined for each engine operating state. The quantity of drive such as valve opening time of the injector 27 is variably controlled according to the target value of the injection quantity, whereby the injection quantity is controlled at a target value thereof. In this regard, the present correction for calculating the injection quantity is performed according to a known processing procedure. In this connection, it is assumed here that the quantity increase correction is performed to the injection quantity, so the quantity increase correction factor K is set at a value greater than 1.0.

In step S233, the target value of an injection quantity is set at Q1×K.

In step S24, processing similar to the processing in steps S11 and S13 shown in FIG. 2 is executed such that the cylinder pressure is detected, the detected data is stored, and the burning parameter deviation Y is calculated. In step S25, it is determined whether the burning parameter deviation Y calculated in step S24 is within an allowance, that is, the burning parameter deviation Y is greater than a threshold B3. The threshold B3 is a fixed value in the present embodiment. Alternatively, the threshold B1 may be a variable value. In the present embodiment, the threshold B3 is set at a value less than the threshold B1 to compensate the combustion deviation with more reliability. The threshold B1 is used in step S14 for determining the heaviness/lightness of the fuel.

While it is determined in step S25 that the burning parameter deviation Y is greater than the threshold B3 (Y>B3), the routine proceeds to step S26 and an abnormal (fail) determination is executed in step S26. Specifically, it is determined in step S26 whether an integrated value (integrated air quantity) of fresh air detected by the air flowmeter 25 is less than a threshold B4. The threshold B4 is a fixed value set correspondingly to a specific period before warming up. The threshold B4 may be a variable value. In a condition where the burning parameter deviation Y does not becomes the threshold B3 or less even when the integrated value of fresh air becomes the threshold B4 or greater, it is determined that the combustion state is abnormal, i.e., the combustion state is in a fail state, and the routine proceeds to step S261. In step S261, the heavy fuel flag F is reset and is brought to a neutral state in which the heavy fuel flag F is neither ON nor OFF, and where specific fail-safe processing is performed. The specific fail-safe processing may include storing a diagnosis code in the EEPROM, lighting a specific alarm lamp, or the like. When the heavy fuel flag F is reset, the present series of processing shown in FIG. 5 is ended with the reset. On the other hand, when it is determined in step S26 that the integrated quantity of air is less than the threshold B4 (integrated quantity of air<B4), it is determined that the combustion state is normal and the processing shown in steps S21 to S25 is repeatedly performed. When it is determined in step S23 that the time that elapses after the quantity increase correction is started is equal to or greater than the threshold B2, the routine proceeds to step S232. In step S232, the quantity increase correction factor K is decreased by the decrease rate K2 from the initial value K1, thereby being updated. Specifically, in step S232, a value obtained by subtracting the decrease rate K2 from the previous value of the quantity increase correction factor K is made the present value of the quantity increase correction factor K.

In this manner, according to the series of processing shown in FIG. 5, the quantity increase correction factor K is updated as described above. When it is determined in step S25 that the burning parameter deviation Y is equal to or less than the threshold B3, the heavy fuel flag F is made OFF in step S251. The series of processing shown in FIG. 5 is ended by making the heavy fuel flag F OFF.

Next, an injection control triggered when the heavy fuel flag F is made OFF in step S142 shown in FIG. 2 or in step S251 shown in FIG. 5 will be described with reference to FIG. 6. The processing shown in FIG. 6 is performed sequentially at intervals of a specific crank angle or at intervals of a specific time until the heavy fuel flag F is made ON or reset.

As shown in FIG. 6, in the present series of processing, the quantity increase correction factor K is set to 1.0 in the first step S31. At this time, the value of the quantity increase correction factor K is gradually changed on the basis of the previous value (gradual change processing).

In step S311, the target value of the injection quantity is set at Q1×K.

The quantity increase correction factor K is set repeatedly and continuously at 1.0 in the first step S31 until it is determined in the subsequent step S32 that the integrated air quantity is equal to or greater than the threshold B5. The threshold B5 is here a fixed value, for example, a value corresponding to a specific period before warming up. The threshold B5 may be a variable value. During this period, the injection quantity is not corrected by the quantity increase correction factor K.

When it is determined in step S32 that the integrated air quantity is equal to or greater than a threshold B5, in the subsequent step S321, the heavy fuel flag F is reset and a correction end flag is made ON. The correction end flag is initially OFF. When this correction end flag is made ON, the present series of processing shown in FIG. 6 is ended.

Figure 7:
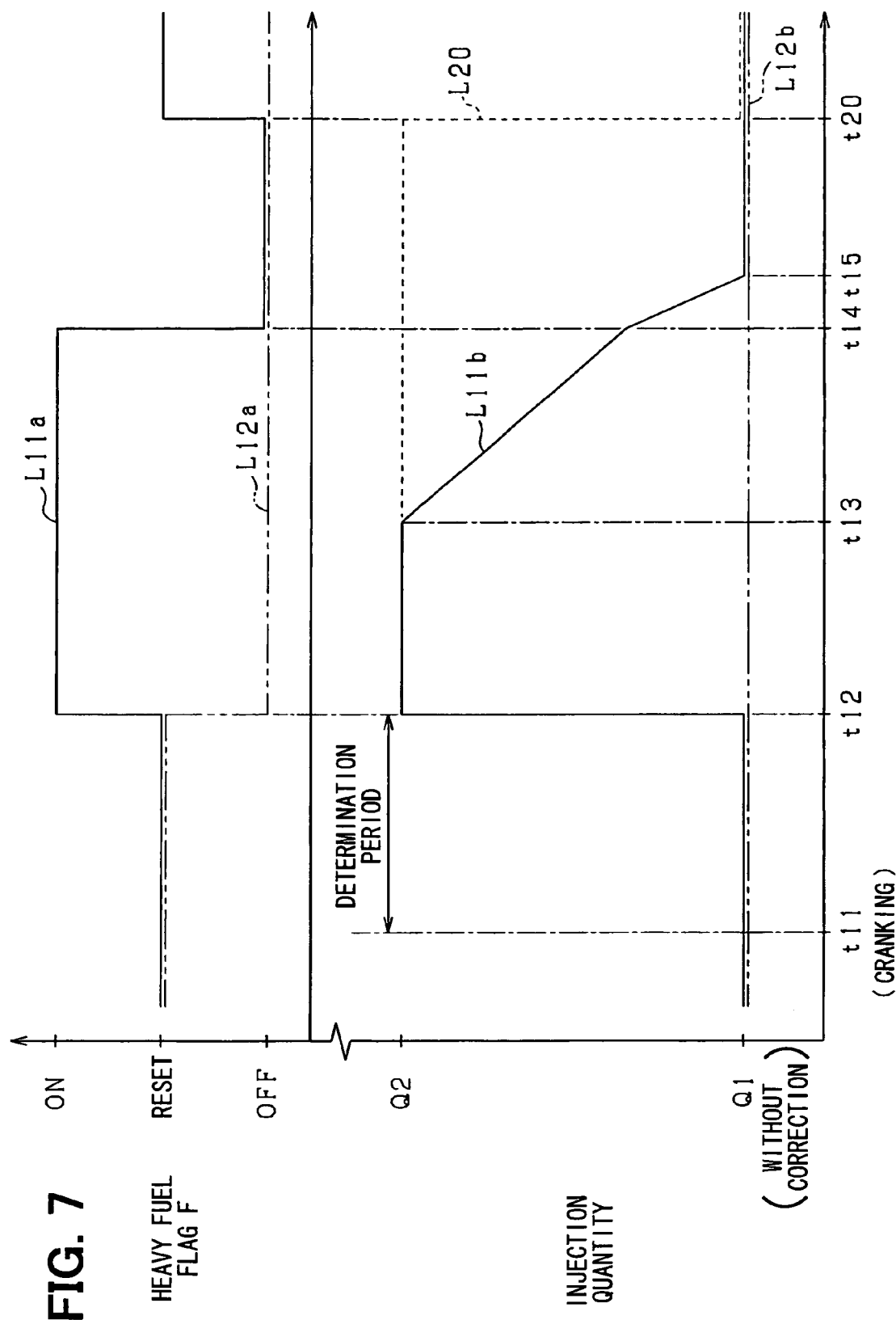
FIG. 7 is a timing chart showing one example of the injection control according to the first embodiment.

Next, one embodiment of the injection control by the ECU 40 will be described in brief with reference to FIG. 7. Here, FIG. 7 is a timing chart showing a progress of the heavy fuel flag F and a progress of the injection quantity. For the sake of comparison, an injection control characteristic by the apparatus shown in FIG. 8 is shown by a broken line L20 in FIG. 7.

As shown in FIG. 7, when cranking is performed at the timing t11 by the starter motor, the determination period (step S12) is started. As described above, in this determination period, cylinder pressure data at each time is stored and accumulated in succession. It is determined in succession in step S12 shown in FIG. 2 whether this determination period is ended, whereby an end timing t12 is detected and the heaviness/lightness of the fuel is detected.

In step S14 in FIG. 2, when it is determined here that the fuel is heavy fuel, as shown by a solid line L11a in FIG. 7, the heavy fuel flag F is made ON in step S141 and the quantity increase correction is performed as shown by the solid line L11b. Specifically, at the end timing t12, the injection quantity kept at the base injection quantity Q1 is increased to an injection quantity Q2 (=Q1×K1) based on the initial value K1 of the quantity increase correction factor calculated in step S21 in FIG. 5. When it is determined in step S23 in FIG. 5 that the time corresponding to the threshold B2 elapses, decreasing of the injection quantity by a specific injection quantity determined by the decrease rate K2 is started at timing t13. The decrease rate K2 is calculated in step S22 shown in FIG. 5. In the present embodiment, this quantity increase correction is performed during a startup injection control period from t12 to t14 (see FIG. 7). When the present quantity increase correction is performed, decrease in the engine rotation speed at the time of starting the engine (see FIG. 8) is increased and recovered to a specific level.

Thereafter, when it is determined in step S25 shown in FIG. 5 that the burning parameter deviation Y becomes the threshold B3 or less, it is determined that decrease in the engine rotation speed is sufficiently recovered and as shown by the solid line L11a in FIG. 7, the heavy fuel flag F is made OFF at the timing t14 (step S251 shown in FIG. 5). Thus, in step S31 shown in FIG. 6, the quantity increase correction factor K is gradually decreased to 1.0 during a period from the timing t14 to the timing t15.

This injection control is performed during the starting of the engine 10 in the period from t11 to t20 determined by the threshold B5 (step S32 shown in FIG. 5). Thus, the heavy fuel flag F is reset at timing t20 by the processing in step S321 shown in FIG. 5, whereby the present series of processing is ended.

On the other hand, when it is determined in step S14 shown in FIG. 2 that the fuel is not heavy fuel, as shown by a double dot and dash line L12a in FIG. 7, the heavy fuel flag F is made OFF at the timing t12 by the processing in step S142 and the processing shown in FIG. 6 is performed. For this reason, as shown by a double dot and dash line L12b in FIG. 7B, the above quantity increase correction is not performed.

According to the engine control apparatus and the fuel property detection apparatus according to the present embodiment, the following excellent effects can be produced.

(1) The control unit of the engine 10 (ECU 40) has the program (injection control means, FIG. 5) for controlling the injection quantity to a target value determined on the basis of the cylinder pressure when the fuel injection is performed during the startup injection control period from t12 to t14 (FIG. 7). The startup injection control period continues from the specific startup timing t12 at the time of starting the engine 10 to the end timing t14 when a specific condition holds. The specific condition relates to the combustion deviation in the present embodiment. Specifically, during the startup injection control period from t12 to t14, the combustion state is monitored (step S24 shown in FIG. 5) and the fuel quantity at each time is controlled to a suitable value. Thus, deterioration of combustion caused due to the property of the fuel and the like at the time of starting the engine 10 can be reduced, thereby emission can be improved.

(2) The ECU 40 has the program of step S24 as burning parameter acquisition means shown in FIG. 5 for converting the cylinder pressure to another burning parameter indicating the combustion state. In steps S21 and S22 shown in FIG. 5, the injection quantity is controlled to a target value determined on the basis of the burning parameter as a converted value acquired in step S24. Specifically, in the above example, at least one of the timing when combustion ends, the period of combustion, the barycenter of combustion (see FIG. 3), and the timing when the heat release rate is at a peak (see FIG. 4) is used as the burning parameter. The burning parameter is generally used as a parameter indicating the combustion state, and is especially significant. Thus, in the present construction, an excellent combustion state as required in practical use can be obtained.

(3) The ECU 40 stores the cylinder pressure in succession in the non-volatile memory in relation to the engine operating condition such as the time that elapses after the cranking or the quantity of operation of the accelerator in step S11 shown in FIG. 2. Further, the ECU 40 stores the cylinder pressure in succession in the non-volatile memory in relation to the engine operating state such as the engine rotation speed, the engine load, or the cylinder temperature in step S24 shown in FIG. 5. With the present construction, the burning parameter can be easily obtained with high accuracy on the basis of the successively stored and accumulated cylinder pressure data.

(4) The ECU 40 has the program as correction factor calculating means of steps S21, S22, S231, and S232 shown in FIG. 5 for finding the correction factor K of the injection quantity with respect to the base target value Q1 on the basis of the cylinder pressure. The injection quantity is controlled to a target value (=Q1×K) determined on the basis of the correction factor K. Thus, the injection control is capable of adequately compensating the combustion deviation, i.e., burning parameter deviation Y, thereby easily and adequately producing the excellent combustion state.

(5) The ECU 40 is constructed in such a way that the correction factor K relating to the injection quantity performs the fuel injection increase correction to the injection quantity. With the present construction, referring to FIG. 8, decrease in the engine rotation speed at the time of starting the engine 10 can be adequately increased and recovered to a specific level.

(6) In the processing shown in FIG. 5, the injection control is performed in the startup injection control period. Specifically, the injection quantity is decreased by a specific injection quantity determined by the decrease rate K2 from the base injection quantity Q1 as initial value. The decrease rate K2 is calculated in step S22 shown in FIG. 5. The correction factor K relating to the target value of the injection quantity is determined by the initial quantity increase value K1 and the decrease rate K2. At the timing of K=1, reducing of the injection quantity is ended. Thus, the quantity increase correction can be easily and adequately performed.

(7) The ECU 40 has the program as control determining means shown in FIG. 2 to determine whether the quantity increase correction is performed on the basis of the pressure in the cylinder during the determination period from t11 to t12 before the startup injection control period from t12 to t14 (see FIG. 7). The present construction can be produced with a simple control.

(8) Moreover, the fuel property detection apparatus has the program as fuel property detection means, shown in FIG. 2 for detecting the property of the fuel on the basis of the cylinder pressure. According to the present apparatus, the property such as the heaviness/lightness of the fuel in the present embodiment can be detected easily with comparatively high accuracy.

In this regard, the above embodiment may be modified in the following manner.

(a) While the gradual change processing is performed in step S31 shown in FIG. 6 In the present embodiment, this gradual change processing may be optional, and the quantity increase correction factor K may be reduced to 1.0 at once.

(b) In the present embodiment, it is determined whether the quantity increase correction is performed only in the determination period from t11 to t12 (FIG. 7) before the startup injection control period t12 to t14 (FIG. 7). Alternatively, it may be determined whether the quantity increase correction is performed throughout the startup period from t11 to t20, for example.

(c) In the present embodiment, the property of the fuel and the target value of the injection quantity are obtained on the basis of the cylinder pressure of all the four cylinders at the time of starting the engine 10. (average value of four cylinders In the present embodiment) The ECU 40 is not necessarily constructed in this manner. The control unit may be constructed to have a program as average value calculation means for calculating an average value of the cylinder pressure or another parameter such as a burning parameter utilizing the cylinder pressure in one cylinder of a multi-cylinder engine. The control unit may detect the property of the fuel or may determine the target value of the injection quantity on the basis of the calculated average value. According to the present construction, an error caused by variations among the cylinders is reduced, and hence the property of the fuel can be detected with further accuracy, thereby a further accurate value as the target value of the injection quantity can be obtained for producing an excellent combustion state.

(d) In the present embodiment, the injection quantity is variably controlled in the startup injection control period from t12 to t14 (FIG. 7). Alternatively, the injection quantity correction may be performed in a binary manner similarly to the control shown in FIG. 8, for example. In this case, it is effective for the ECU 40 to have a program as correction period variation means for variably changing the length of the correction period from t51 to t52 shown in FIGS. 8A and 8B on the basis of the cylinder pressure. According to the present construction, the length of the correction period can be suitably set on the basis of the cylinder pressure, thereby a steadily excellent emission characteristic can be produced.

(e) In the present embodiment, the ECU 40 variably controls the injection quantity on the basis of the cylinder pressure, thereby manipulating the engine output, i.e., output torque at a desired value. Alternatively, another parameter relating to the output torque can be also used in place of the injection quantity. In this case, a program for controlling the parameter relating to the output torque corresponds to torque control means.

A parameter and a combination of parameters can be arbitrary used in place of the above injection quantity. Specifically, the parameters may include an ignition timing. The parameters may include a charging efficiency, a supercharged air quantity, a fresh air quantity, an intake air temperature in the case of an engine provided with a turbocharger. The parameters may include an exhaust gas recirculation (EGR) quantity in the case of an engine provided with an EGR unit. The parameters may include the valve timing and the valve lift of intake and exhaust valves in the case of an engine provided with a variable valve device. The parameters may include a driving quantity of an ignition assistance unit in the case of an engine provided with an ignition assistance unit constructed of a glow plug or the like. Also with the present construction, when the engine output is controlled on the basis of the cylinder pressure, decrease in the engine rotation speed at the time of starting the engine (see FIG. 8) can be increased and recovered to a specific level.

(f) The heaviness/lightness of the fuel detected by the processing shown in FIG. 2 may be applied to use other than the engine control.

(g) The type of the engine may be arbitrary modified to, for example, a direct injection type gasoline engine and a compression ignition type diesel engine. The system configuration of the fuel property detection apparatus may be also arbitrary modified. For example, in the present embodiment, the cylinder pressure sensor is mounted in each of the cylinders. Alternatively, the cylinder pressure sensor may be mounted only in part of the cylinders. For example, the cylinder pressure sensor may be mounted only to one cylinder. In this case, cylinder pressure values of the other cylinders may be estimated based on the output of the cylinder pressure sensor. Moreover, a heaviness/lightness detection sensor may be provided to detect the heaviness/lightness of the fuel with higher accuracy, similarly to JP-A-3-179150.

Second Embodiment

Figure 9:
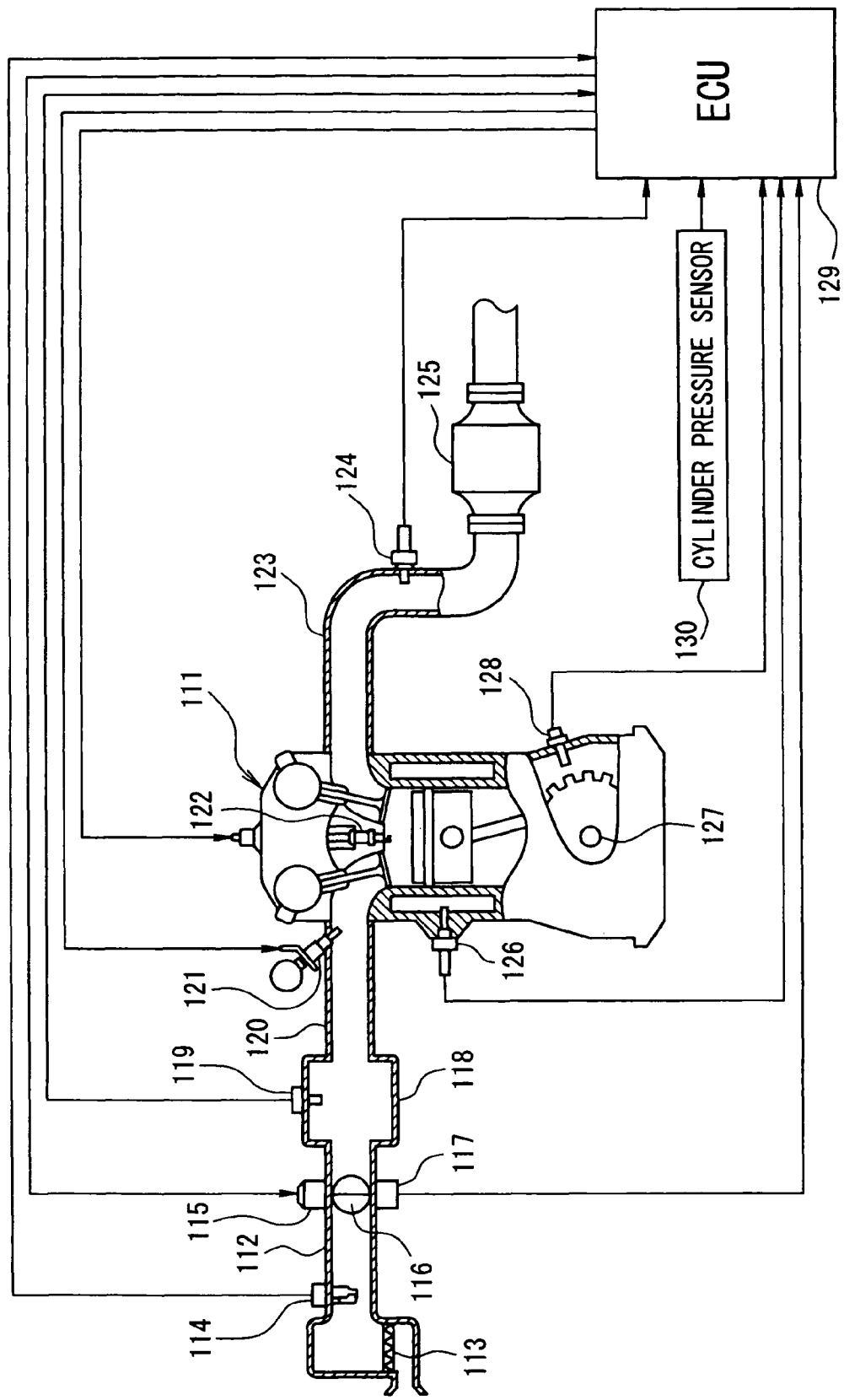
FIG. 9 is a schematic view showing an engine control system according to a second embodiment.

First, a general construction of the entire engine control system will be described on the basis of FIG. 9. An air cleaner 113 is provided upstream most of an intake pipe 112 of an internal combustion engine 111. An air flowmeter 114 is provided downstream of the air cleaner 113 to detect an intake air quantity. A throttle valve 116 and a throttle opening sensor 117 are provided downstream of the air flowmeter 114. A motor 115 is provided to control an opening of the throttle valve 116. The throttle opening sensor 117 detects the opening (throttle opening) of the throttle valve 116.

A surge tank 118 is provided downstream of the throttle valve 116. An intake-pipe pressure sensor 119 is provided to the surge tank 118 to detect pressure in an intake pipe. The surge tank 118 is provided with intake manifolds 120, which lead air into respective cylinders of the engine 111. Fuel injection valves 121 are respectively provided in the vicinity of intake ports of the intake manifolds 120 for respective cylinders of the engine to inject fuel. Ignition plugs 122 are mounted to a cylinder head of the engine 111 to ignite air-fuel mixture in the cylinders by generating spark discharge.

An exhaust pipe 123 of the engine 111 is provided with an exhaust gas sensor 124 such as an air-fuel ratio sensor and an oxygen sensor for detecting an air-fuel ratio of exhaust gas or rich and lean conditions of exhaust gas. A catalyst 125 such as a three-way catalyst is provided downstream of the exhaust gas sensor 124 for purification of exhaust gas.

A cylinder block of the engine 111 is provided with a cooling-water temperature sensor 126 and a crank angle sensor 128. The cooling-water temperature sensor 126 detects temperature of cooling water of the engine 111. The crank angle sensor 128 outputs a pulse signal each time where the engine 111 rotates by a predetermined crank angle. A crank angle and an engine speed are detected on the basis of an output signal from the crank angle sensor 128.

The cylinder head of the engine 111 is provided with a cylinder pressure sensor 130 for detecting cylinder pressure for each cylinder or only a specific cylinder. The cylinder pressure sensor 130 may be integrated with the ignition plug 122. Alternatively, the cylinder pressure sensor 130 may has a sensor portion separately from the ignition plug 122. In this construction, the sensor portion of the cylinder pressure sensor 130 faces the interior of the combustion chamber.

Outputs of such various sensors are input into an electronic control unit (ECU) 129. The ECU 129 is constructed mainly of a microcomputer to execute various engine control programs stored in a built-in ROM (memory medium) to control fuel injection quantities of the fuel injection valves 121 and ignition timings of the ignition plugs 122 according to an engine operating state.

Figure 12:
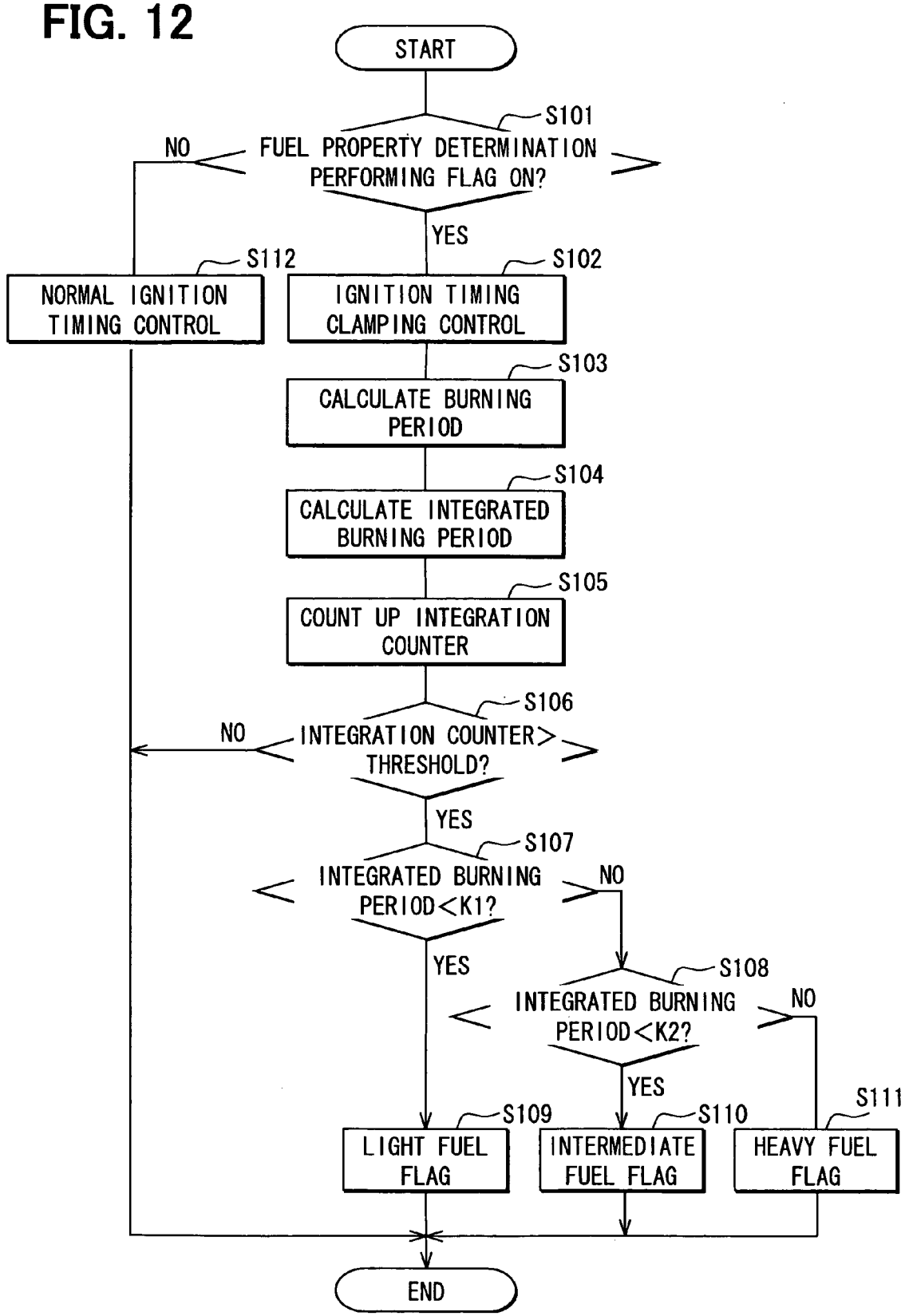
FIG. 12 is a flow chart showing a fuel property determination routine according to the second embodiment.

Moreover, the ECU 129 performs a fuel property determination routine shown in FIG. 12 to calculate a burning period as a burning parameter of the combustion state on the basis of the cylinder pressure detected by the cylinder pressure sensor 130. The ECU 129 compares an integrated value of the burning period in a specific period with a threshold to determine the property of the fuel.

Figure 10:
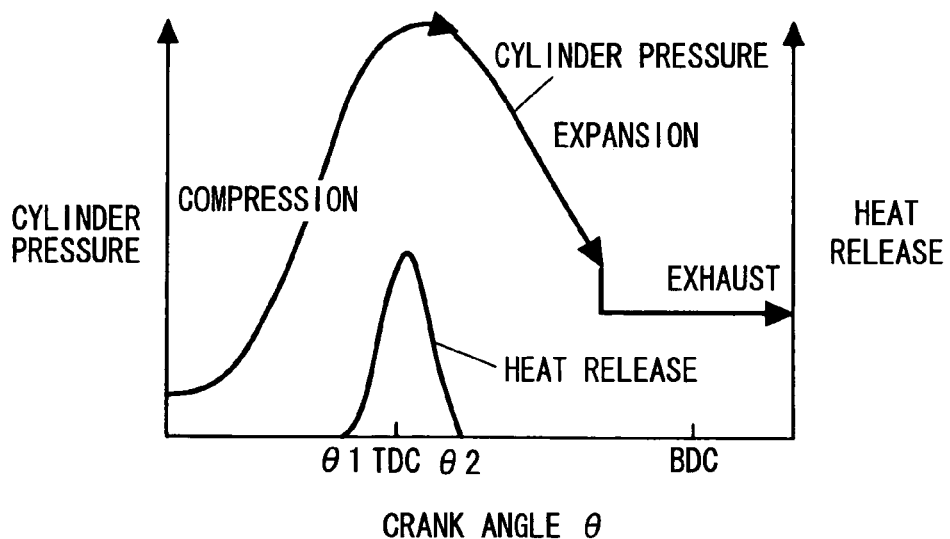
FIG. 10 is a time chart showing a relationship between cylinder pressure and released heat according to the second embodiment.

Next, a method for calculating a burning period will be described with reference to FIG. 10 and FIG. 11.

In general, a quantity of heat released at a crank angle θ is calculated by the following equation.

Quantity of heat released=$\{dP(\theta) \times V(\theta) + \kappa \times P(\theta) \times dV(\theta)\}/(\kappa-1)$ where κ=specific heat ratio
P(θ)=cylinder pressure at crank angle θ
dP(θ)=change in cylinder pressure at crank angle θ
V(θ)=combustion chamber volume at crank angle θ
dV(θ)=change in combustion chamber volume at crank angle θ

A total quantity of heat released during a burning period from the start of combustion to the end of combustion is calculated by the following equation.

Total quantity of heat released=$\int$(quantity of heat released)$d\theta$

Figure 11:
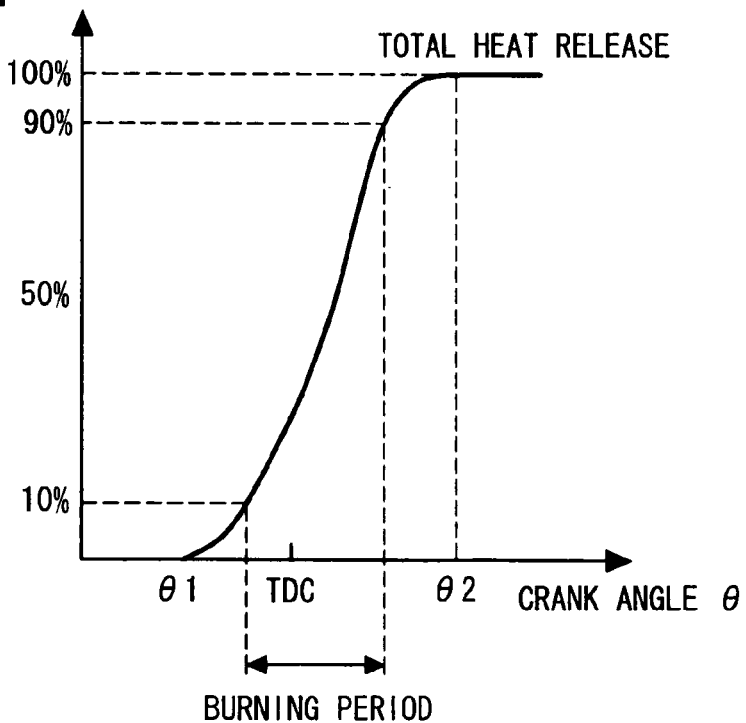
FIG. 11 is a time chart showing a relationship between a total quantity of released heat and a burning period according to the second embodiment.

As shown in FIG. 11, in the present embodiment, a period from a time point where the total quantity of heat released is 10% to a time point where the total quantity of heat released is 90% is defined as a burning period. That is, the burning period starts from the crank angle, in which the total quantity of heat released after the start of combustion increases to become 10% of the total quantity of heat released during the period between the start and the end of combustion. The burning period ends at the crank angle, in which the quantity of the heat increases to become 90% of the total quantity. Here, the burning period is not limited to a period from the time point where the total quantity of released heat is 10% to the time point where the total quantity of released heat is 90%. The burning period may be changed as appropriate. For example, the burning period may be started from the time point where the total quantity of heat released is 5%, and may be ended at the time point where the total quantity of heat released is 95%. Alternatively, the burning period may be started from the time point where the total quantity of heat released is 15%, and may be ended at the time point where the total quantity of heat released is 85%.

In general, the ignition timing of the engine 111 greatly contributes to the combustion state such as the combustion rate and the burning period. Thus, when the ignition timing is changed, the combustion state is also changed. In consideration of the present phenomenon, in the present embodiment, an ignition timing clamping control is performed to clamp an ignition timing in a period between start of cranking and completion of determination of the property of the fuel. The start of cranking may correspond to turning on a starter switch. Thus, the property of the fuel is determined based on the burning period in a state where variations in the burning period caused by variations in the ignition timing are substantially eliminated.

The processing content of a fuel property determination routine performed by the ECU 129 and shown in FIG. 12 will be described below.

The fuel property determination routine as fuel property determination means shown in FIG. 12 is performed at intervals of a specific period in a period where the power of the ECU 129 is on. When the present routine is started, first, it is determined in step S101 whether a fuel property determination performing flag is on. The fuel property determination performing flag is set on, for example, when a specific fuel property determination performing condition is satisfied, and is reset when the fuel property determination is completed.

When it is determined in step S101 that the fuel property determination performing flag is on, the routine proceeds to step S102. In step S102, the ignition timing clamping control is performed for clamping the ignition timing from the start of cranking to substantially eliminate variations in the burning period caused by variations in the ignition timing. The processing of step S102 serves as ignition timing clamping control means.

In this regard, the clamped ignition timing during the ignition timing clamping control may be set to a previously set fixed value to simplify the calculation of the clamped ignition timing. Alternatively, the clamped ignition timing may be read from a data map or may be calculated by a mathematical equation according to the cooling water temperature or the oil temperature instead of the engine temperature. In this case, it suffices to set the data map or the mathematical equation for obtaining the clamped ignition timing in such a way that as the cooling water temperature or the oil temperature decreases, the clamped ignition timing advances. Thus, the clamped ignition timing can be changed in response to the engine temperature, thereby being appropriately set.

The routine proceeds to step S103 where the total quantity of heat released during the burning period from the start of combustion to the end of combustion is calculated by the above method. In step S103, a period from the time point where the total quantity of heat released is 10% to the time point where the total quantity of heat released is 90% is calculated as the burning period, for example. The processing of step S103 acts as burning parameter calculation means.

The routine proceeds to step S104 where the burning period of the present processing is added to the integrated value of the burning period until the previous processing to calculate an integrated value of the burning period at the present processing.

Present integrated value=Previous integrated value+Present burning period

Thereafter, the routine proceeds to step S105 where an integration counter is counted up for determining a period, during which the burning period is integrated. The routine proceeds to step S106 where it is determined whether the integration counter is greater than a threshold.

When it is determined in step S106 that the integration counter is equal to or less than the threshold, the burning period is integrated in a state where the ignition timing clamping control is repeatedly performed until the integration counter becomes greater than the threshold. That is, the burning period is integrated in a state where variations in the burning period caused by variations in the ignition timing are substantially eliminated.

When it is determined in step S106 that the integration counter becomes greater than the threshold, the routine proceeds to step S107 where it is determined whether the integrated value of the burning period is less than a threshold K1. When it is determined that the integrated value of the burning period is less than the threshold K1, it is determined that the property of the fuel is light, and the routine proceeds to step S109 where a light fuel flag is set on. Thus, the present routine is ended.

When it is determined in step S107 that the integrated value of the burning period is equal to or greater than the threshold K1, the routine proceeds to step S108 where it is determined whether the integrated value of the burning period is less than a threshold K2, where K1<K2. When it is determined in step 107 and step S108 that the integrated value of the burning period is equal to or greater than the threshold K1 and is less the threshold K2, it is determined that the property of the fuel is intermediate between light and heavy. Thus, the routine proceeds to step S110 where an intermediate fuel flag is set on. Thus, the present routine is ended.

When it is determined in step S108 that the integrated value of the burning period is equal to or greater than the threshold K2, it is determined that the property of the fuel is heavy, and the routine proceeds to step S111 where a heavy fuel flag is set on. Thus, the present routine is ended.

In this regard, the thresholds K1 and K2 used for determining the property of the fuel may be set to previously set fixed values to simplify the calculation. However, evaporation of the fuel is varied according to the engine temperature, and consequently, the burning period is also varied. Thus, the thresholds K1 and K2 may be read from a data map or may be calculated by a mathematical equation according to the cooling water temperature or the oil temperature being information substituting for the engine temperature. Thus, the thresholds K1 and K2 used for determining the property of the fuel can be appropriately set according to the engine temperature.

The determination of the property of the fuel is completed in this manner. Subsequently, when it is determined in step S101 that the fuel property determination performing flag is off, the ignition timing clamping control is ended, and the routine proceeds to step S112 where a normal ignition timing control is performed to control the ignition timing according to the engine operating state and the like.

In the present embodiment, the ignition timing clamping control is performed for clamping the ignition timing from the start of cranking to the completion of determination of the property of the fuel. Thus, the property of the fuel can be determined with high accuracy on the basis of the burning period in a state where variations in the burning period, which is caused by variations in the ignition timing to cause of a false determination of the property of the fuel, are substantially eliminated. Thus, it is possible to restrict a false determination caused by variations in the combustion state due to variations in the ignition timing during the fuel property determination processing period, by the ignition timing clamping control, and hence to improve the accuracy of determination of the property of the fuel.

In addition, in the present embodiment, the ignition timing clamping control is performed from the start of cranking. Therefore, the property of the fuel can be determined with high accuracy in a state where the ignition timing clamping control is surly performed. Thus, the property of the fuel can be determined in a state where variations in the combustion state caused by variations in the ignition timing are surly substantially eliminated.

In the present embodiment, the ignition timing clamping control is performed from the start of cranking. However, generally, even when the ignition timing is varied, the combustion state is little varied until a specific number such as two to three combustions are ended after the start of cranking. Therefore, the ignition timing clamping control may be performed after ending the specific number of explosions.

Further, in the present embodiment, the ignition timing is clamped when the ignition timing clamping control is performed. However, the range of variations in the ignition timing may be narrowed by restricting variations in the ignition timing within a range such that variations in the ignition timing substantially do not affect the combustion state. In short, it suffices to control to limit variations in the combustion state caused by variations in the ignition timing within a range such that a false determination of the property of the fuel can be restricted.

Still further, in the present embodiment, the property of the fuel is determined in three tiers including the light, the intermediate, and the heavy properties. Alternatively, the property of the fuel may be determined in two tiers or in four or more tiers. Moreover, the heaviness of the fuel may be determined steplessly according to the integrated value of the burning period with reference to a data map in which the heaviness of the fuel is defined by using the integrated value of the burning period as a parameter.

Still further, in the present embodiment, the burning period is used as a burning parameter of the information of the combustion state. However, the property of the fuel may be determined by using other burning parameter such as the combustion rate.

The application of the above embodiments are not limited to a system for determining the property of the fuel of gasoline. The embodiments can be applied to a system for determining a property of fuel including alcohol such as methanol and ethanol, blended fuel made by blending alcohol with gasoline, and fuel other than gasoline such as light oil.

In the present embodiments and modifications, it is assumed that various pieces of software and programs are used, but the same function may be produced by hardware such as a dedicated circuit.

The above processings such as calculations and determinations are not limited being executed by the ECU 40, 129. The control unit may have various structures including the ECU 40, 129 shown as an example.

The above structures of the embodiments can be combined as appropriate.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A method of controlling output torque produced by combustion of fuel in a cylinder of an engine, the method comprising:

determining a target value of the output torque on the basis of pressure in the cylinder; and controlling a parameter, which relates to the output torque, at the target value in a startup injection control period in starting the engine, wherein the startup injection control period is between a specific startup timing and an end timing where a specific condition is satisfied; and calculating an average value per one cylinder of the multi-cylinder engine, the average value indicating pressure in the cylinder or a parameter related to the pressure in the cylinder, wherein said determining a target value determines the target value on the basis of the average value.

2. A method of controlling output torque produced by combustion of fuel in a cylinder of an engine, the method comprising:

determining a target value of the output torque on the basis of pressure in the cylinder; and controlling a parameter, which relates to the output torque, at the target value in a startup injection control period in starting the engine, wherein the startup injection control period is between a specific startup timing and an end timing where a specific condition is satisfied; and acquiring a burning parameter indicating a state of combustion by converting the pressure in the cylinder, wherein said determining a target value determines the target value on the basis of the converted burning parameter.

3. A method of controlling output torque produced by combustion of fuel in a cylinder of an engine, the method comprising:

determining a target value of an injection quantity of fuel on the basis of pressure in the cylinder; and controlling the injection quantity at the target value in a startup injection control period in starting of the engine, wherein the startup injection control period is between a specific startup timing and an end timing where a specific condition is satisfied, and the engine is a multi-cylinder engine having a plurality of cylinders, and calculating an average value per one cylinder of the multi-cylinder engine, the average value indicating pressure in the cylinder or a parameter related to the pressure in the cylinder, wherein said determining a target value determines the target value on the basis of the average value, and said controlling the injection quantity controls the injection quantity at the target value.

4. The method as claimed in claim 3, further comprising:

calculating a correction factor of a base target value of the injection quantity on the basis of the pressure in the cylinder, wherein said determining a target value determines the target value on the basis of the correction factor, and said controlling the injection quantity controls the injection quantity at the target value.

5. The method as claimed in claim 4, wherein said calculating a correction factor calculates the correction factor to correct the target value so as to increase the injection quantity.

6. The method as claimed in claim 5, wherein said controlling the injection quantity performs the injection control to reduce an initial quantity increase value by a decrease rate so as to reduce the injection quantity in the startup injection control period, and said calculating a correction factor calculates the correction factor by determining at least one of the initial quantity increase value, a timing at which the reduction of the initial quantity increase value ends, and the decrease rate.

7. The method as claimed in claim 4, further comprising:

variably changing a correction period with respect to the base target value of the injection quantity on the basis of the pressure in the cylinder.

8. The method as claimed in claim 3, further comprising:

determining whether said controlling the injection quantity performs the injection control based on the pressure in the cylinder on the basis of the pressure in the cylinder in a determination period before the startup injection control period.

9. A method of controlling output torque produced by combustion of fuel in a cylinder of an engine, the method comprising:

determining a target value of an injection quantity of fuel on the basis of pressure in the cylinder; and controlling the injection quantity at the target value in a startup injection control period in starting of the engine, wherein the startup injection control period is between a specific startup timing and an end timing where a specific condition is satisfied, and acquiring a burning parameter indicating a state of combustion by converting the pressure in the cylinder, wherein said determining a target value determines the target value on the basis of the converted burning parameter, and said controlling the injection quantity controls the injection quantity at the target value.

10. The method as claimed in claim 9, wherein the burning parameter is at least one of a timing when combustion ends, a period of combustion, a barycenter of combustion, and a timing when a heat release rate is at a peak.

11. An engine control apparatus for controlling output torque produced by combustion of fuel in a cylinder of an engine, the apparatus comprising:

means for determining a target value of an injection quantity of fuel on the basis of pressure in the cylinder; and means for controlling the injection quantity at the target value in a startup injection control period in starting of the engine, wherein the startup injection control period is between a specific startup timing and an end timing where a specific condition is satisfied, and the engine is a multi-cylinder engine having a plurality of cylinders, means that calculates an average value per one cylinder of the multi-cylinder engine, the average value indicating pressure in the cylinder or a parameter related to the pressure in the cylinder, wherein the means for determining a target value determines the target value on the basis of the average value, and the means for controlling the injection quantity controls the injection quantity at the target value.

12. The engine control apparatus as claimed in claim 11, further comprising:

means for calculating a correction factor of a base target value of the injection quantity on the basis of the pressure in the cylinder, wherein the means for determining a target value determines the target value on the basis of the correction factor, and the means for controlling the injection quantity controls the injection quantity at the target value.

13. The engine control apparatus as claimed in claim 12, wherein the means for calculating a correction factor calculates the correction factor to correct the target value so as to increase the injection quantity.

14. The engine control apparatus as claimed in claim 13, wherein the means for controlling the injection quantity performs the injection control to reduce an initial quantity increase value by a decrease rate so as to reduce the injection quantity in the startup injection control period, and the means for calculating a correction factor calculates the correction factor by determining at least one of the initial quantity increase value, a timing at which the reduction of the initial quantity increase value ends, and the decrease rate.

15. The engine control apparatus as claimed in claim 12, further comprising:

means for variably changing a correction period with respect to the base target value of the injection quantity on the basis of the pressure in the cylinder.

16. The engine control apparatus as claimed in claim 11, further comprising:

means for determining whether the means for controlling the injection quantity performs the injection control based on the pressure in the cylinder on the basis of the pressure in the cylinder in a determination period before the startup injection control period.

17. A fuel property detection apparatus for the engine provided with the engine control apparatus according to claim 11 and adapted to producing output torque by combustion of fuel in a cylinder, the apparatus comprising:
means for detecting pressure in the cylinder; and
means for detecting a property of fuel on the basis of the pressure in the cylinder.

18. An engine control apparatus for controlling output torque produced by combustion of fuel in a cylinder of an engine, the apparatus comprising:
means for determining a target value of the output torque on the basis of pressure in the cylinder; and
means for controlling a parameter, which relates to the output torque, at the target value in a startup injection control period in starting the engine, wherein the startup injection control period is between a specific startup timing and an end timing where a specific condition is satisfied; and
means that calculates an average value per one cylinder of the multi-cylinder engine, the average value indicating pressure in the cylinder or a parameter related to the pressure in the cylinder,
wherein the means for determining a target value determines the target value on the basis of the average value.

19. The engine control apparatus as claimed in claim 18,
wherein the engine is a spark-ignited engine adapted to igniting fuel by a specific ignition mode, and
wherein the parameter is an ignition timing.

20. A fuel property detection apparatus for the engine provided with the engine control apparatus according to claim 18 and adapted to producing output torque by combustion of fuel in a cylinder, the apparatus comprising:
means for detecting pressure in the cylinder; and
means for detecting a property of fuel on the basis of the pressure in the cylinder.

21. An engine control apparatus for controlling output torque produced by combustion of fuel in a cylinder of an engine, the apparatus comprising:
means for determining a target value of an injection quantity of fuel on the basis of pressure in the cylinder; and
means for controlling the injection quantity at the target value in a startup injection control period in starting of the engine, wherein the startup injection control period is between a specific startup timing and an end timing where a specific condition is satisfied, and
means for acquiring a burning parameter indicating a state of combustion by converting the pressure in the cylinder,
wherein the means for determining a target value determines the target value on the basis of the converted burning parameter, and
the means for controlling the injection quantity controls the injection quantity at the target value.

22. The engine control apparatus as claimed in claim 21, wherein the burning parameter is at least one of a timing when combustion ends, a period of combustion, a barycenter of combustion, and a timing when a heat release rate is at a peak.

23. The engine control apparatus as claimed in claim 21, further comprising:
calculating means for calculating a correction factor of a base target value of the injection quantity on the basis of the pressure in the cylinder,
wherein the means for determining a target value determines the target value on the basis of the correction factor, and
the means for controlling the injection quantity controls the injection quantity at the target value.

24. The engine control apparatus as claimed in claim 23, wherein the means calculating a correction factor calculates the correction factor to correct the target value so as to increase the injection quantity.

25. The engine control apparatus as claimed in claim 24,
wherein the means for controlling the injection quantity performs the injection control to reduce an initial quantity increase value by a decrease rate so as to reduce the injection quantity in the startup injection control period, and
the means for calculating a correction factor calculates the correction factor by determining at least one of the initial quantity increase value, a timing at which the reduction of the initial quantity increase value ends, and the decrease rate.

26. The engine control apparatus as claimed in claim 23, further comprising:
means for variably changing a correction period with respect to the base target value of the injection quantity on the basis of the pressure in the cylinder.

27. The engine control apparatus as claimed in claim 21, further comprising:
means for determining whether the means for controlling the injection quantity performs the injection control based on the pressure in the cylinder on the basis of the pressure in the cylinder in a determination period before the startup injection control period.

28. A fuel property detection apparatus for the engine provided with the engine control apparatus according to claim 21 and adapted to producing output torque by combustion of fuel in a cylinder, the apparatus comprising:
means for detecting pressure in the cylinder; and
means for detecting a property of fuel on the basis of the pressure in the cylinder.

29. An engine control apparatus for controlling output torque produced by combustion of fuel in a cylinder of an engine, the apparatus comprising:
means for determining a target value of the output torque on the basis of pressure in the cylinder; and
means for controlling a parameter, which relates to the output torque, at the target value in a startup injection control period in starting the engine, wherein the startup injection control period is between a specific startup timing and an end timing where a specific condition is satisfied; and
means for acquiring a burning parameter indicating a state of combustion by converting the pressure in the cylinder,
wherein the means for determining a target value determines the target value on the basis of the converted burning parameter.

30. The engine control apparatus as claimed in claim 29,
wherein the engine is a spark-ignited engine adapted to igniting fuel by a specific ignition mode, and
wherein the parameter is an ignition timing.

31. A fuel property detection apparatus for the engine provided with the engine control apparatus according to claim 29 and adapted to producing output torque by combustion of fuel in a cylinder, the apparatus comprising:
means for detecting pressure in the cylinder; and
means for detecting a property of fuel on the basis of the pressure in the cylinder.

* * * * *